United States Patent
Kogure et al.

(10) Patent No.: US 7,244,380 B2
(45) Date of Patent: Jul. 17, 2007

(54) PROCESS FOR PRODUCING POLYSTYRENE RESIN FOAM BY EXTRUSION

(75) Inventors: Naochika Kogure, Utsunomiya (JP); Teruyuki Akiyama, Utsunomiya (JP); Noritoshi Nishiyama, Utsunomiya (JP)

(73) Assignee: JSP Corporation, Tokyo (JP)

( * ) Notice: Subject to any disclaimer, the term of this patent is extended or adjusted under 35 U.S.C. 154(b) by 21 days.

(21) Appl. No.: 11/107,874

(22) Filed: Apr. 18, 2005

(65) Prior Publication Data

US 2005/0238866 A1  Oct. 27, 2005

(30) Foreign Application Priority Data

Apr. 26, 2004  (JP) .............................. 2004-129402

(51) Int. Cl.
 *B29C 44/20*  (2006.01)
(52) U.S. Cl. ............................ 264/50; 264/53; 521/79; 521/139
(58) Field of Classification Search ................. 264/50, 264/51, 53; 521/79, 139
See application file for complete search history.

(56) References Cited

U.S. PATENT DOCUMENTS 2,884,386 A * 4/1959 Denslow et al. .............. 521/55
5,110,836 A * 5/1992 Harclerode et al. ........... 521/58

FOREIGN PATENT DOCUMENTS

| JP | 06-057028 | 3/1994 |
| JP | 2004-292664 | 10/2003 |
| JP | 2004-059595 A | 2/2004 |
| JP | 2004-196907 A | 7/2004 |

\* cited by examiner

*Primary Examiner*—Allan R. Kuhns
(74) *Attorney, Agent, or Firm*—Bacon & Thomas, PLLC

(57) ABSTRACT

A process for an extruded resin foam, comprising extruding a foamable composition comprising a melted polystyrene resin and a physical blowing agent through a die to obtain a polystyrene resin foam having a thickness of at least 10 mm and a transverse cross-sectional area of at least 50 cm$^2$, wherein said extrusion is performed so that the ratio Mz/Mn of a Z average molecular weight Mz of the polystyrene resin foam to a number average molecular weight Mn of the polystyrene resin foam, each measured by gel permeation chromatography, is 8.0 or more.

15 Claims, No Drawings

PROCESS FOR PRODUCING POLYSTYRENE RESIN FOAM BY EXTRUSION

CROSS-REFERENCE TO RELATED APPLICATION

This application claims, under 35 USC 119, priorities of Japanese Patent Application No. 2004-129402, filed Apr. 26, 2004, disclosures of which, inclusive of the specifications, claims and drawings, are hereby incorporated by reference herein.

BACKGROUND OF THE INVENTION

1. Field of the Invention

This invention relates to process for producing an extruded, polystyrene resin foam for use as a heat insulator for walls, floors, roofs and so on of buildings or as a tatami mat core. The present invention is also directed to an extruded, polystyrene resin foam.

2. Description of Prior Art

Because polystyrene resin foams have excellent heat insulating property and desirable mechanical strengths, plates thereof have been widely used as heat insulators.

One method of producing such a foam plate includes the steps of heating and kneading a polystyrene resin together with a nucleating agent, mixing the kneaded mixture with a physical blowing agent, extruding the resulting melted mixture (foamable composition), and optionally feeding the extrudate to a shaping device attached to the outlet of the die (see, for example, Japanese Unexamined Patent Publications No. 2003-292664, No. 2004-59595 and No. 2004-196907).

Japanese Patent No. 3,244,196 discloses an extruded polystyrene resin foam sheet obtained by extruding a polystyrene resin having a ratio (Mz/Mw) of the Z average molecular weight Mz to the weight average molecular weight Mw of 1.7 to 2.5, a ratio (Mw/Mn) of the weight average molecular weight Mw to the number average molecular weight Mn of 2.0 to 3.0 and a weight average molecular weight of $2.8 \times 10^5$ to $4.0 \times 10^5$, each measured by gel permeation chromatography. The foam sheet is used for the production of shaped articles by thermoforming. The above method, however, cannot produce a thick foam. The patent is silent with respect to a Mz/Mn ratio. The Mz/Mn ratios of the polystyrene resins specifically disclosed in the working examples of the patent are calculated to be 2.4 and 4.7.

In order to obtain a thick foam having low density (high expansion ratio), it is necessary to use a large amount of a blowing agent. The use of a large amount of the blowing agent, however, causes separation of the blowing agent from the foamable composition and premature foaming of the foamable composition within the die lip prior to the discharge thereof from the die lip. As a consequence, the resulting foam becomes poor in appearance and in uniformity of cell sizes.

BRIEF SUMMARY OF THE INVENTION

It is, therefore, an object of the present invention to provide a process which can produce a polystyrene resin foam having a large size, in particular a large cross-sectional area, and a high expansion ratio by extrusion, and to provide such a polystyrene resin foam.

In accordance with the present invention there is provided a process for producing a polystyrene resin foam, wherein a foamable composition containing a melted polystyrene resin and a physical blowing agent is extruded through a die to obtain the polystyrene resin foam having a thickness of at least about 10 mm and a transverse cross-sectional area of at least about 50 cm². The extrusion is performed such that the ratio Mz/Mn of a Z average molecular weight Mz of the polystyrene resin foam to a number average molecular weight Mn of the polystyrene resin foam, each measured by gel permeation chromatography, is 8.0 or more. The present invention also provides a polystyrene resin foam having a thickness of at least 10 mm, a transverse cross-sectional area of at least 50 cm², and a ratio Mz/Mn of a Z average molecular weight Mz to a number average molecular weight Mn, each measured by gel permeation chromatography, of 8.0 or more.

Other objects, features and advantages of the present invention will become apparent from the detailed description of the preferred embodiments of the invention to follow.

DETAILED DESCRIPTION OF THE PREFERRED EMBODIMENTS OF THE INVENTION

The process of the present invention may be suitably carried out using an extruder having a flat die through which a foamable composition including a melted polystyrene resin and a physical blowing agent is extruded to an expansion zone which is maintained at a pressure lower than that in the die. During the passage through the expansion zone, the extruded mass of the foamable composition is foamed and cooled. The expansion zone preferably includes a shaping device, such as a guider or shaping rolls, disposed downstream of the die to shape the extruded foamable composition into a foam plate of a desired dimension. The guider may be connected to the die and includes a pair of upper and lower plates, preferably formed of a fluorocarbon resin such as a polytetrafluoroethylene resin, disposed in parallel with each other or slightly inclined relative to each other to define a diverging passage having a cross-sectional area increasing in the direction along which the extruded mass continuously travels.

To obtain the foamable composition, a polystyrene resin feed is introduced to the extruder and melted and kneaded therein. The physical blowing agent and, if desired, additives are added to the melted resin to obtain the foamable composition. After the temperature of the foamable composition has been adjusted by cooling to a suitable temperature the foamable composition is extruded through the die. The suitable temperature varies with the kind of the polystyrene resin, the amount and kind of an optionally added fluidity improving agent and the amount and kind of the blowing agent but is generally about 110 to about 130° C.

The polystyrene resin for use in the present invention may be a styrene homopolymer or a copolymer mainly composed of styrene. Examples of the styrene copolymer include a styrene-acrylic acid copolymer, a styrene-methyl acrylate copolymer, a styrene-ethyl acrylate copolymer, a styrene-methacrylic acid copolymer, a styrene-methyl methacrylate copolymer, a styrene-ethyl methacrylate copolymer, a styrene-maleic anhydride copolymer, a styrene-polyphenylene ether copolymer, a styrene-butadiene copolymer, a styrene-acrylonitrile copolymer, an acrylonitrile-butadiene-styrene terpolymer, a styrene-methylstyrene copolymer and styrene-dimethylstyrene copolymer. These hompolymers and copolymers may be used alone or in combination of two or more thereof. The styrene copolymers preferably comprise styrene monomeric units of at least about 50 mol %, more preferably at least about 80 mol %.

If desired, the polystyrene resin may be used as a mixture with another polymer or copolymer such as a polyolefin resin or a styrene-based elastomer as long as the object and effect of the present invention are not adversely affected. The amount of such another polymer or copolymer is less than about 100 parts by weight, preferably 0 to about 60 parts by weight, more preferably 0 to about 20 parts by weight, still more preferably 0 to about 10 parts by weight, per 100 parts by weight of the polystyrene resin.

The thickness of the polystyrene resin foam produced should be at least 10 mm, preferably 10 to 150 mm, more preferably 20 to 120 mm. A thickness of the foam of less than 10 mm is insufficient for the foam to exhibit desired heat insulating property and is also disadvantageous for use as a lightweight fill for a lightweight embankment process for reasons of poor working efficiency.

The transverse cross-sectional area of the polystyrene resin foam produced (cross-sectional area along a plane normal to the extrusion direction (machine direction) of the foam) should be at least 50 cm$^2$, preferably at least 60 cm$^2$, more preferably at least 100 cm. The upper limit of the transverse cross-sectional area is generally 2,000 cm$^2$, preferably 1,500 cm$^2$. A transverse sectional area of less than 50 cm$^2$ will cause a reduction of working efficiency in a heat insulation process or a lightweight embankment process.

It is important that extrusion should be performed so that the Mz/Mn ratio of a Z average molecular weight Mz of the polystyrene resin foam to a number average molecular weight Mn of the polystyrene resin foam, each measured by gel permeation chromatography, is 8.0 or more. When the Mz/Mn ratio is 8.0 or more, the premature foaming of the foamable composition prior to the discharge from the die lip is prevented by increasing the pressure of the foamable composition in the die lip even when the foamable composition contains a relatively large amount of a blowing agent. Further, the foamable composition has a good fluidity. Therefore, the resulting foam has a large transverse cross-sectional area and a large expansion ratio. When the Mz/Mn ratio is less than 8.0, the polystyrene resin foam fails to have a large transverse sectional area and a large expansion ratio.

Even when a polystyrene resin having a Mz/Mn ratio of 8.0 or more is used as a raw material feed, the resin is apt to be decomposed during kneading to result in a reduction of Mz/Mn below 8.0. Therefore, in order to produce a polystyrene resin foam having a Mz/Mn ratio of 8.0 or more, it is desired to suitably select a raw material polystyrene resin feed and/or to prevent the occurrence of thermal decomposition of polystyrene during kneading.

Suitable raw material polystyrene feeds are as follows.

(A) An ordinary molecular weight polystyrene resin (hereinafter referred to as NMPS for brevity) is fed together with an ultra-high molecular weight polystyrene resin (hereinafter referred to as UHPS). The amount of UHPS is generally 0.4 to 50 parts by weight, preferably 0.5 to 40 parts by weight, more preferably 1 to 35 parts by weight, per 100 parts by weight of NMPS. An amount of UHPS in an amount of less than 0.4 part by weight causes a difficulty in maintaining Mz/Mn of 8.0 or more. Too large an amount of UHPS in excess of 40 parts by weight will result in a reduction of the fluidity of the raw material polystyrene resin during the kneading so that the kneaded mass cannot be sufficiently cooled without the formation of coarse cells in the resulting foam. When UHPS has a relatively large Mz, then the amount of UHPS may be reduced. On the other hand, the lower the Mz of UHPS, the larger becomes the amount of UHPS required.

(B) NMPS and UHPS are previously melted and kneaded to obtain a polystyrene blend having Mz/Mn of 9.0 to 16.0, preferably 10.0 to 16.0. The blend is used as the raw material polystyrene resin feed. The blend generally has Mn of $7.0 \times 10^4$ to $1.4 \times 10^5$, Mz of $6.5 \times 10^5$ to $1.9 \times 10^6$, and Mw/Mn of 3.0 to 6.0. A Mz/Mn ratio of the blend less than 9.0 is apt to result in a polystyrene resin foam whose Mz/Mn ratio is less than 8.0.

(C) NMPS and UHPS are previously melted and kneaded to obtain a polystyrene blend having Mz/Mn of greater than 16.0 and a Z average molecular weight of at least $2.0 \times 10^6$. The blend is used as at least part of the raw material polystyrene resin feed. Preferably, the blend is used as a master batch. Thus, a part of the master batch is used together with additional NMPS as the raw material polystyrene feed. The master batch preferably has Mn of $7.0 \times 10^4$ to $1.6 \times 10^5$, Mz of at least $2.0 \times 10^6$, more preferably $2.0 \times 10^6$ to $4.5 \times 10^6$, and Mw/Mn of 4.0 to 15.0. NMPS used for the preparation of the master batch preferably has a melt flow rate (at 200° C., 5 kgf load) of 1 to 50 more preferably 5 to 45 g/10 min, still more preferably 10 to 30 g/10 min, for reasons of inhibition of thermal decomposition of UHPS during kneading. The content of NMPS in the master batch is generally 15 to 95% by weight, preferably 25 to 90% by weight, still more preferably 35 to 85% by weight, based on a total weight of NMPS and UHPS. The amount of the master batch used together with the additional NMPS is desired to be small from the standpoint of economy. The master batch is generally used in an amount of 1 to 100 parts by weight, preferably 3 to 80 parts by weight, more preferably 5 to 30 parts by weight, per 100 parts by weight of the additional NMPS. Since the smaller Mz of the master batch, namely smaller Mz/Mn of the master batch, the greater is the amount of the master batch to be used for maintaining Mz/Mn of the polystyrene resin foam at 8.0 or more. Thus, the Mz/Mn of the master batch should be higher than 16.0.

(D) A polystyrene resin obtained by suspension polymerization, seed polymerization or multi-stage polymerization and having Mz/Mn of at least 9.0, preferably 10.0 to 16.0 is used as the raw material polystyrene feed. The polystyrene resin generally has Mn of $7.0 \times 10^4$ to $1.4 \times 10^5$, Mz of $6.5 \times 10^5$ to $2.0 \times 10^6$, and Mw/Mn of 3.0 to 6.0. A Mz/Mn ratio of the polystyrene resin less than 9.0 is apt to result in a polystyrene resin foam whose Mz/Mn ratio is less than 8.0.

The polystyrene resin foam produced by the process of the present invention preferably has Mn of $8.0 \times 10^4$ to $1.5 \times 10^5$, more preferably $8.0 \times 10^4$ to $1.3 \times 10^5$.

NMPS as used herein is intended to refer to a polystyrene resin having a weight average molecular weight Mw of $1.4 \times 10^5$ to $5.0 \times 10^5$. Preferably, NMPS has Mw of $1.5 \times 10^5$ to $4.5 \times 10^5$ for reasons of good extrusion foaming workability and good mechanical properties of the polystyrene resin foam. NMPS generally has Mn of $7.0 \times 10^4$ to $1.2 \times 10^5$, Mz of $5.0 \times 10^5$ to $1.5 \times 10^6$, Mw/Mn of 2.0 to 4.0 and Mz/Mn of 5.0 to 7.5. NMPS is widely commercially available.

UHPS as used herein is intended to refer to a polystyrene resin having Mw of $1.0 \times 10^6$ to $5.0 \times 10^6$. Preferably, UHPS has Mw of $1.1 \times 10^6$ to $4.8 \times 10^6$, more preferably $1.2 \times 10^6$ to $4.5 \times 10^6$ for reasons of good efficiency of kneading with NMPS and easiness in achieving the object of the present invention. UHPS generally has Mn of $1.6 \times 10^5$ to $1.0 \times 10^6$, Mz of $2.5 \times 10^6$ to $7.0 \times 10^6$, Mw/Mn of 3.0 to 6.5 and Mz/Mn of 6.0 to 16.0. UHPS may be produced by, for example, a continuous polymerization method in which a styrene monomer is reacted while preventing the formation of a gel. Thus, during the course of the polymerization, a suitable amount of an organic peroxide (polymerization agent) is added intermittently to the reaction mixture. UHPS may also be produced by suspension polymerization, seed polymerization or emulsion polymerization. When an organic peroxide used as a polymerization agent remains in UHPS product, the molecular weight of UHPS is considerably lowered when heated. Thus, it is advisable that UHPS be treated for the deactivation of the polymerization agent. UHPS is commercially available as BLENDEX865 and BLENDEX28270 (products of Crompton Inc.).

As described previously, it is desirable to prevent the occurrence of thermal decomposition of polystyrene during kneading thereof in order to produce a polystyrene resin foam having a Mz/Mn ratio of 8.0 or more.

One method to prevent the thermal decomposition of the high molecular weight components is to use a temperature of 160 to 240° C., preferably 170 to 225° C., in the melting and kneading the polystyrene resin feed. Another method is to add a thermal stabilizer or processing stabilizer to the polystyrene resin feed. The amount of the stabilizer is suitably 0.05 to 2 parts by weight per 100 parts by weight of the polystyrene resin feed. A lactone compound may be used as the stabilizer. A method in which the feed of the raw material styrene resin is carried out in an oxygen-free atmosphere (for example, under a nitrogen stream) or a method in which air is discharged from a vent hole of the extruder may also be used. Further, when a master batch is used as described in (C) above, it is effective to prepare the master batch in such a manner that NMPS is melted in an extruder to which USPS is added at a midway of the extruder using a side feeder. By adding UHPS to already melted NMPS, the mixing may be efficiently carried out within a short period of time so that a reduction of Mz of UHPS may be prevented. The above methods may be adopted singly or in combination of two or more.

Examples of the stabilizer include pentaerythritoltetrakis[3-(3,5-di-tert-butyl-4-hydroxyphenyl)propionate, octadecyl-3-(3,5-di-tert-butyl-4-hydroxyphenyl)propionate, ethylenebis(oxyethylene)bis[3-(5-tert-butyl-4-hydroxy-m-tolyl)propionate], 1,3,5-tris(3,5-tert-butyl-4-hydroxybenzyl)-1,3,5-triazine-2,4,6(1H,3H,5H)-trione, 2,6-di-tert-butyl-4-(4,6-bis(octylthio)1,3,5-triazine-2-ylamino)phenol, tris(2,4-di-tert-butylphenyl)phosphite and 5,7-di-tert-butyl3-(3,4-dimethylphenyl)-3H-benzofuran-2-one. The above stabilizers may be used singly or in combination of two or more thereof. The stabilizers can serve to stabilize not only the polystyrene resins but also a flame retardant.

As used herein, Mz, Mw, Mn are as measured by gel permeation chromatography (GPC). The typical GPC method is as follows.

A polystyrene resin or a polystyrene resin foam (30 mg) is dissolved in 20 mL of tetrahydrofuran (THF). After removal of insoluble matters, if any, by filtration, the solution is measured for GPC. From the point in the elution peak attributed to the polystyrene and corresponding to the molecular weight of $1.9 \times 10^7$, a line is drawn in parallel with the abscissa to determine the peak area thereof. From the peak area, the molecular weight is determined on the basis of a standard calibration curve obtained using standard polystyrene.

GPC device: GPC mode high speed liquid chromatogram manufactured by GL Science Inc.
Column: Shodex GPO columns KF-806, KF-805 and KF803 (manufactured by Showa Denko Co., Ltd.) connected in series in this order
Column Temperature: 40° C.
Solvent: THF
Elution rate: 1.0 mL/min
Sample concentration: 1.5 weight/volume %
Sample injection amount: 0.2 mL
Detector: UV-visible detector UV702 manufactured by GL Science Inc. (measured wavelength: 254 nm)
Molecular weight range of calibration curve: $1.9 \times 10^7$ to $5.4 \times 10^3$.

The extruded polystyrene resin foam of the present invention preferably has an apparent density of 20 to 35 kg/m$^3$, more preferably 22 to 33 kg/m$^3$. A polystyrene resin foam having an apparent density of less than 20 kg/m$^3$, which is itself difficult to produce, is poor in mechanical and physical properties due to a small closed cell content. When the polystyrene resin foam has an apparent density of over 35 kg/m$^3$, a satisfactory heat insulating property cannot be obtained unless it has a large thickness.

The foamable composition can contain various additives such as a thermal stabilizer, a nucleating agent, a colorant, a flame retardant, a fluidity improving agent and a filler as long as the object of the present invention is not adversely affected. The addition of a flame retardant is particularly desirable when the polystyrene resin foam obtained from the formable composition is applied as a heat insulator for structures.

A bromine-containing flame retardant is suitably used for the purpose of the present invention. Examples of the bromine-containing flame retardant include tetrabromobisphenol A, 2,2-bis(4-hydroxy-3,5-dibromophenyl)propane, hexabromocyclododecane, tris(2,3-dibromopropyl)isocyanurate, tribromophenol, decabromodiphenyloxide and brominated bisphenol ether compounds. The bromine-containing flame retardant has a tendency to be thermally degraded when kneaded with a polystyrene resin to form a radical which, in turn, acts on the polystyrene to degrade the polystyrene. Thus, the use of a thermal stabilizer is desirable, because the stabilizer can serve to stabilize the bromine-containing flame retardant as well as the polystyrene.

The physical blowing agent may be an aliphatic hydrocarbon such as propane, cyclopentane, isobutane or n-butane, a halogenated hydrocarbon such as methyl chloride, ethyl chloride, 1,1,1,2-tetrafluoroetane, an alcohol such as ethanol, an aliphatic ether such as dimethyl ether, fluorine-containing ether such as 1,1,1,2-tetrafluoroethyl trifluoromethyl ether, and an inorganic blowing agent such as water or carbon dioxide. These blowing agents may be used singly or in combination of two or more thereof. If desired, a chemical blowing agent, such as azodicarbonamide, which can also serve to function as a cell controlling agent and to make the cell size small may be suitably used in a small amount.

The amount of the physical blowing agent varies with the kind of the blowing agent, the apparent density of the desired polystyrene resin foam and the kind of the polystyrene resin, but generally in the range of 0.8 to 3.0 moles, preferably 0.9 to 2.7 moles, more preferably 1.0 to 2.2 moles, per 1 kg of the polystyrene resin. When two or more of the physical blowing agents are used in combination, the above amount represents a total amount thereof. When a chemical blowing agent is cojointly used, the amount thereof is 0.05 to 5 parts by weight, preferably 0.1 to 3 parts by weight, more preferably 0.1 to 2 parts by weight, per 100 parts by weight of the polystyrene resin.

It is preferred that the polystyrene resin foam produced by the process of the invention have an average cell diameter in the thickness direction ($D_T$) in the range of 0.1 to 2.0 mm, more preferably 0.12 to 1.5 mm, most preferably 0.15 to 1.3 mm, for reasons of high heat insulation property. It is difficult to prepare a polystyrene resin foam having $D_T$ of 0.1 mm while maintaining a high transverse sectional area and a high expansion ratio. In order to obtain such high flame retardancy as to meet the flammability standard of Type 3 for extruded polystyrene resin foam insulation plates provided in JIS A9511-1995, namely in order obtain a polystyrene resin foam having a thermal conductivity of 0.028 W/m·K or less, it is important that the average cell diameter $D_T$ should be 0.1 to 0.5 mm and that a blowing agent, such as isobutane or 1,1,1,2-tetrafluoroethane, having both low thermal conductivity and low permeability to the polystyrene resin, be contained in the cells. In this case, since isobutane is flammable, it is not advantageous to use isobutane in an excessively large amount. Also, when 1,1,1,2-tetrafluoroethane is used in an excessively large amount, the resulting polystyrene resin foam becomes defective because 1,1,1,2-tetrafluoroethane tends to be separated from the foamable composition within the extruder. Therefore, such a blowing agent is preferably used together with highly permeable gas or gases such as methyl chloride, ethyl chloride, an aliphatic ether (e.g. dimethyl ether), water and carbon dioxide.

The average cell diameter herein is measured as follows. A polystyrene resin foam is cut in the thickness direction along a direction normal to the extrusion direction (i.e., along the transverse direction). The cross-section is magnified by a microscope and projected or displayed on a screen or a monitor. Three straight lines are drawn on the magnified image along the thickness direction in the case of measurement of $D_T$, i.e. one line at the center and two lines at both end portions. The number of the cells crossing each straight line is counted. An average cell length is calculated by dividing the length of each straight line by the counted number. $D_T$ is an arithmetic mean of the three average cell lengths.

To measure the average cell diameter in the transverse direction ($D_W$), three straight lines each having a length of 3000 μm are drawn on the above magnified image along the transverse direction, i.e. one line at the center and two lines at both upper and lower end portions. The number of the cells crossing each straight line is counted. An average cell length is calculated by dividing the length of each straight line (namely 3000 μm) by a value obtained by subtracting 1 from the counted number. $D_W$ is an arithmetic mean of the three average cell lengths.

To measure the average cell diameter in the extrusion direction ($D_L$), the polystyrene resin foam is cut in the thickness direction along the extrusion direction. The cross-section is magnified by a microscope and projected or displayed on a screen or a monitor. Three straight lines each having a length of 3000 μm are drawn on the above magnified image along the extrusion direction, i.e. one line at the center and two lines at both upper and lower end portions. The number of the cells crossing each straight line is counted. An average cell length is calculated by dividing the length of each straight line (namely 3000 μm) by a value obtained by subtracting 1 from the counted number. $D_L$ is an arithmetic mean of the three average cell lengths.

An average cell diameter in the horizontal direction of the polystyrene resin foam ($D_H$) is the arithmetic mean of $D_W$ and $D_L$.

The polystyrene resin foam preferably has a $D_T/D_H$ ratio (cell strain rate) of 0.7 to 2.0, more preferably 0.8 to 1.5, still more preferably 0.8 to 1.2, for reason of good heat insulation property. When the cell strain rate is greater than 2, the cells are elongated in the thickness direction. In this case, the heat insulation efficiency of the foam is not fully satisfactory. When the cell strain rate is less than 0.7, the cells are so flattened that the compression strength of the foam is not fully satisfactory.

One method for obtaining a small $D_L$ is to use a nucleating agent such as talc in a large amount. In this case, too large an amount of the nucleating agent causes an increase of open cell content and, therefore, a reduction of thermal insulation efficiency. To cope with this problem, when the nucleating agent is used in a relatively large amount, it is desirable to use a polystyrene resin which shows a high melt viscosity without significant reduction of MFR. Attaching a guider to the die lip to control the cell strain rate is also effective. Alternatively, an inorganic blowing agent such as carbon dioxide may be used to form cells with small DL without use of a large amount of the nucleating agent.

It is preferred that the polystyrene resin foam to be used for a heat insulation plate satisfy the flammability standard as specified in JIS A9511(1995). Namely, when tested for the flammability in accordance with 4.13.1 "Measuring Method A" disclosed in JIS A9511(1995), the polystyrene resin foam is desired to be such that the flame extinguishes within 3 seconds without remaining residues and that the burning does not spread beyond the combustion limit line. Because burning of the polystyrene resin foam is prevented from spreading, the polystyrene resin foam satisfies the safety requirement as a heat reserving plate for construction and building materials From the standpoint of improved heat insulation efficiency and improved mechanical strengths, it is preferred that the polystyrene resin foam have a closed cell content of 90% or more, more preferably 93% or more. In particular, the higher the closed cell content, the higher becomes the heat insulation efficiency and the longer becomes the heat insulation service life.

The closed cell content herein is according to Procedure C of ASTM D-2856-70 as follows. The true volume Vx of a cut sample of the extruded polystyrene resin foam is measured using Air Comparison Pycnometer Type-930 manufactured by Toshiba Beckmann Inc. In this case, a cut sample cut into the size of 25 mm×25 mm×20 mm and having no molded skin is placed in a sample cup for measurement. When the foam is so thin that a cut sample having a thickness of 20 mm cannot be cut off therefrom, the measurement may be conducted using, for example, two cut samples having a size of 25 mm×25 mm×10 mm together. The closed cell content S (%) of the sample is calculated by the following formula:

$$S(\%)=(Vx-W/\rho)\times100/(Va-W/\rho)$$

wherein

Vx: true volume (cm$^3$) of the cut sample(s) measured by the above method, which corresponds to a sum of a volume of the resin constituting the cut sample(s) and a total volume of all the closed cells in the cut sample(s);

Va: apparent volume (cm$^3$) of the cut sample(s) used for the measurement, which is calculated from the outer dimension thereof;

W: weight (g) of the cut sample(s) used for the measurement; and

ρ: density (g/cm$^3$) of the resin constituting the extruded foam plate.

Similar measurement is carried out on three different samples and the arithmetic mean represents the closed cell content of the polystyrene resin foam.

The following examples will further illustrate the present invention. Parts are by weight.

Preparation of Master Batch

PREPARATION EXAMPLE 1

To a dual axis extruder 77 parts of a polystyrene resin (Grade: 679, manufactured by PS Japan Co., Ltd., Mn: 7.3×10$^4$, Mw: 2.0×10$^5$, Mz: 3.8×10$^5$) and 1 part of a heat stabilizer (Grade: IRGASTAB STYL66, manufactured by Ciba Specialty Chemicals Co., Ltd.) were fed, and melted and kneaded therein at a temperature not exceeding 220° C. To the thus melted and kneaded mass, 25 parts of a high molecular weight polystyrene (Grade: BLENDEX865, manufactured by Crompton Inc., Mn: 7.9×10$^5$, Mw: 3.1×10$^6$, Mz: 5.7×10$^6$) were fed using a side feeder connected at a midway of the dual axis extruder, and the mixture was melted and kneaded in the extruder at a temperature not exceeding 220° C. The resulting melted mixture was then extruded in the form of strands. The strands were cooled and cut to obtain Master Batch A in the form of pellets having Mn of 8.3×10$^4$, Mw of 7.3×10$^5$, Mz of 3.8×10$^6$ and Mz/Mn of 45.8.

COMPARATIVE PREPARATION EXAMPLE 1

To a dual axis extruder 75 parts of a polystyrene resin (Grade: 679, manufactured by PS Japan Co., Ltd., Mn: 7.3×10$^4$, Mw: 2.0×10$^5$, Mz: 3.8×10$^5$) and 25 parts of a high molecular weight polystyrene (Grade: BLENDEX865, manufactured by Crompton Inc., Mn: 7.9×10$^5$, Mw: 3.1×10$^6$, Mz: 5.7×10$^6$) were fed, and the mixture was melted and kneaded in the extruder at a temperature of 250° C. The resulting melted mixture was then extruded in the form of strands. The strands were cooled and cut to obtain Master Batch B in the form of pellets having Mn of 1.1×10$^5$, Mw of 4.5×10$^5$, Mz of 1.4×10$^6$ and Mz/Mn of 12.7. It is inferred that the reduced Mz/Mn of Master Batch B is attributed to the fact that no stabilizer was used and that the two polystyrene resins were simultaneously fed to the extruder and kneaded at 250° C.

Apparatus and Conditions for Producing Extruded Foams:

Three, first, second and third extruders having diameters of 65 mm, 90 mm and 150 mm, respectively, were connected in series. The first extruder had a blowing agent feed port at a position near the downstream end thereof. A flat die having a die lip with a width of 65 mm and a clearance of 2 mm (rectangular parallelepiped sectional shape) was attached to a tip end of the third extruder. The extrusion speed was 50 kg per hour.

Raw materials were fed to the first extruder where the raw materials were heated to 220° C., melted and kneaded. The kneaded mass was mixed with the blowing agent at a portion near the downstream end of the first extruder to obtain a foamable composition in the form of a melt. The foamable composition was then successively passed to the second and third extruders and extruded from the die lip to the atmosphere. In this case, the temperature of the foamable composition was adjusted at a suitable foaming temperature shown in Table 1 in the third extruder. The foaming temperature was as measured at a position where the die was connected to the extruder. The extrudate which was discharged from the die lip and which started foaming was passed through a guider and compressed there. The extrudate was then allowed to fill in a shaping device and was shaped into a plate, thereby obtaining an extruded foam plate.

EXAMPLES 1-3

The raw materials used were 88 parts of polystyrene resin (Grade: HH32, manufactured by Idemitsu Petrochemical Co., Ltd., Mn: 1.2×10$^5$, Mw: 3.5×10$^5$, Mz: 7.9×10$^5$), 12 parts of Master Batch A, 0.5 part of a talc master batch composed of 35% by weight of the polystyrene resin, 60% by weight of talc (HIFILLER#12, manufactured by Matumura Sangyo Co., Ltd.) and 5% by weight of a dispersant, and 4 parts of a flame retardant master batch composed of 50% by weight of the polystyrene resin and 50% by weight of hexabromocyclododecane). The blowing agent was a mixture of isobutane and methyl chloride with a molar ratio of isobutane to methyl chloride of 15:85 and was used in an amount shown in Table 1. The amounts of the blowing agent ingredients are shown in terms of mole per 1 kg of the polystyrene resin (mol/kg).

Using the raw materials, extruded foam plates were produced using the apparatus and production conditions described above. The apparent density, Mn, Mw, Mz/Mn, thickness, lateral sectional area, average cell diameter in the thickness direction, cell strain rate, closed cell content and moldability of the extruded foam plates are shown in Table 1. The "pressure in lip" in Table 1 means a pressure of the foamable composition measured by a pressure sensor mounted on an inside wall of the die at a position 150 mm spaced inward from the tip of the die lip. The moldability was evaluated on the basis of the following ratings.

good: the foam plate had good appearance
poor: the foam plate had surface cracks and poor appearance

COMPARATIVE EXAMPLE 1

Example 1 was repeated in the same manner as described except that Master Batch A was not used at all. The results are shown in Table 1 above.

COMPARATIVE EXAMPLE 2

Example 1 was repeated in the same manner as described except that Master Batch B was substituted for Master Batch A. The results are shown in Table 1 above.

TABLE 1

|  | Example | | | Comparative Example | |
|---|---|---|---|---|---|
|  | 1 | 2 | 3 | 1 | 2 |
| Polystyrene (HH32) (parts) | 88 | 88 | 88 | 100 | 88 |
| Master Batch A (parts) | 12 | 12 | 12 | — | — |
| Master Batch B (parts) | — | — | — | — | 12 |
| Amount of Isobutane (mol/kg) | 0.26 | 0.27 | 0.28 | 0.26 | 0.26 |

TABLE 1-continued

|  | | Example | | | Comparative Example | |
| --- | --- | --- | --- | --- | --- | --- |
|  | | 1 | 2 | 3 | 1 | 2 |
| blowing agent | Methyl chloride (mol/kg) | 1.45 | 1.53 | 1.62 | 1.45 | 1.45 |
|  | Total amount (mol/kg) | 1.7 | 1.8 | 1.9 | 1.7 | 1.7 |
| Pressure in lip (kgf/cm$^2$) | | 26 | 24 | 23 | 21 | 21 |
| Foaming temperature (° C.) | | 122 | 122 | 123 | 122 | 122 |
| Apparent density (kg/m$^3$) | | 25.9 | 24.6 | 23.3 | 26.3 | 26.9 |
| Mn (×10$^5$) | | 1.0 | 1.1 | 1.1 | 1.1 | 1.0 |
| Mw (×10$^5$) | | 3.3 | 3.4 | 3.7 | 3.0 | 3.1 |
| Mz/Mn | | 8.9 | 8.4 | 10 | 5.9 | 7.9 |
| Thickness (mm) | | 50 | 50 | 50 | 50 | 50 |
| Transverse sectional area (cm$^2$) | | 100 | 100 | 100 | 100 | 100 |
| Average cell diameter in thickness direction (mm) | | 0.9 | 1.0 | 1.1 | 0.8 | 0.9 |
| Cell strain rate | | 1.2 | 1.1 | 1.2 | 1.5 | 1.4 |
| Closed cell content (%) | | 95 | 94 | 93 | 85 | 88 |
| Moldability | | good | good | good | poor | poor |

EXAMPLE 4

Example 1 was repeated in the same manner as described except that the die lip used had a width of 115 mm and a gap of 1 mm, that the talc master batch was used in an amount of 0.17 part and that the blowing agent used was a mixture composed of 1,1,1,2-tetrafluoroethane (HFC134a), isobutane and methyl chloride. The results are shown in Table 2.

COMPARATIVE EXAMPLE 3

Example 4 was repeated in the same manner as described except that Master Batch A was not used at all. The results are shown in Table 2.

TABLE 2

| Example | | | 4 | |
| --- | --- | --- | --- | --- |
| Comparative Example | | | | 3 |
| Polystyrene | (parts) | | 88 | 100 |
| Master Batch A | (parts) | | 12 | — |
| Amount of blowing agent | HFC134a | (mol/kg) | 0.52 | 0.52 |
|  | Isobutane | (mol/kg) | 0.26 | 0.26 |
|  | Methyl chloride | (mol/kg) | 0.52 | 0.52 |
|  | Total amount | (mol/kg) | 1.3 | 1.3 |
| Pressure in lip | (kgf/cm$^2$) | | 68 | 54 |
| Foaming temperature | (° C.) | | 124 | 124 |
| Apparent density | (kg/m$^3$) | | 34.2 | 35.7 |
| Mn | (×10$^4$) | | 9.2 | 9.1 |
| Mw | (×10$^5$) | | 2.7 | 2.5 |
| Mz/Mn | | | 8.2 | 6.5 |
| Thickness | (mm) | | 25 | 25 |
| Transverse sectional area | (cm$^2$) | | 62.5 | 62.5 |
| Average cell diameter in thickness direction | (mm) | | 0.17 | 0.16 |
| Cell strain rate | | | 1.1 | 1.2 |
| Closed cell content | (%) | | 95 | 87 |
| Moldability | | | good | poor |

EXAMPLE 5

Example 1 was repeated in the same manner as described except that the talc master batch was used in an amount of 0.2 part and that the blowing agent used was a mixture composed of isobutane, ethanol and carbon dioxide. The results are shown in Table 3.

COMPARATIVE EXAMPLE 3

Example 5 was repeated in the same manner as described except that Master Batch A was not used at all. The results are shown in Table 3.

TABLE 3

| Example | | | 5 | |
| --- | --- | --- | --- | --- |
| Comparative Example | | | | 4 |
| Polystyrene (HH32) | (parts) | | 88 | 100 |
| Master Batch A | (parts) | | 12 | — |
| Amount of blowing agent | Isobutane | (mol/kg) | 0.29 | 0.29 |
|  | Ethanol | (mol/kg) | 0.66 | 0.66 |
|  | Carbon dioxide | (mol/kg) | 0.35 | 0.35 |
|  | Total amount | (mol/kg) | 1.3 | 1.3 |
| Pressure in lip | (kgf/cm$^2$) | | 38 | 33 |
| Foaming temperature | (° C.) | | 123.5 | 123.8 |
| Apparent density | (kg/m$^3$) | | 33.0 | 34.9 |
| Mn | (×10$^5$) | | 1.0 | 1.1 |
| Mw | (×10$^5$) | | 2.8 | 3.0 |
| Mz/Mn | | | 8.5 | 6.2 |
| Thickness | (mm) | | 50 | 50 |
| Transverse sectional area | (cm$^2$) | | 100 | 100 |
| Average cell diameter in thickness direction | (mm) | | 1.0 | 0.9 |
| Cell strain rate | | | 1.1 | 1.3 |
| Closed cell content | (%) | | 94 | 91 |
| Moldability | | | good | poor |

The results of Examples 1-5 shown above indicate that the process of the present invention can produce thick expanded foam plates having a large sectional area and a high expansion ratio.

In Examples 1 to 3, the polystyrene resin containing UHPS is extruded and foamed using a large amount of a blowing agent. In Example 1, UHPS is used in a significant amount so that the foam plate has a Mz/Mn ratio greater than 8. Notwithstanding the use of a large amount of blowing agent, the viscosity of the foamable composition remains high and, therefore, the pressure of the foamable composition flowing in the lip portion is kept high. As a result, the extruded foam plate obtained is free of surface cracks. The amount of the blowing agent further increases in Examples 2 and 3. Yet, the extruded foam plates obtained are free of surface cracks.

In Comparative Example 1, UHPS is not used. Because Mz/Mn is less than 8, the pressure of the foamable composition flowing in the lip portion decreases. Thus, the foamable composition has started foaming before the composition is discharged from the die lip. The foam plate has, therefore, poor appearance.

In Comparative Example 2, UHPS is used. However, because of decomposition of UHPS during the preparation of Master Batch B, Mz/Mn is less than 8. Thus, the foam plate has poor appearance. If Master Batch B is used by itself without being mixed with NMPS(HH32), an extruded foam plate similar to that obtained in Example 1 will be produced. In this case, however, the material cost will be considerably high.

Example 4 uses a blowing agent different from that used in Example 1. Because Mz/Mn is greater than 8, the extruded foam plate has good appearance.

Comparative Example 3 does not use UHPS and Mz/Mn is less than 8. Thus, the foam plate has poor appearance.

Example 5 uses a blowing agent different from that used in Example 1. Because Mz/Mn is greater than 8, the extruded foam plate has good appearance.

Comparative Example 4 does not use UHPS and Mz/Mn is less than 8. Thus, the foam plate has poor appearance.

The critical pressure below which the foamable composition is apt to foam within the die lip varies depending upon the amount, kind and composition of the blowing agent, the clearance of the lip and the foaming temperature. The critical pressure is found to be 22 kgf/cm$^2$ in the case of Examples 1 to 3 and Comparative Examples 1 and 2, 55 kgf/cm$^2$ in the case of Example 4 and Comparative Example 3 and 34 kgf/cm$^2$ in the case of Example 5 and Comparative Example 4. Thus, since the pressures employed in Examples 4 and 5 are significantly lower than the critical pressures, the amount of the blowing agent is considered to be further increased in Examples 4 and 5 to further increase the expansion ratio. Since the use of an extruder having an increased extrusion capacity can increase the pressure of the foamable composition within the die lip. In such a case, therefore, the expansion ratio can be further increased.

Preparation of UHPS:

PREPARATION EXAMPLE 2

In a 1.2 m$^3$ reactor having an inside volume of 1.2 m$^3$, 350 kg of ion exchanged water, 1.4 kg of tribasic calcium phosphate and 17.5 g of sodium dodecylbenzenesulfonate were charged, to which a solution, obtained by dissolving 175 g of t-butyl peroxy-2-ethylhexanoate, 245 g of t-butyl peroxy-2-ethylhexylmonocarbonate and divinylbenzene (purity: about 55% manufactured by Kishida Chemical Co., Ltd.) in 350 kg of styrene monomer, was added. After purging the reaction system with nitrogen, the contents in the reactor were heated to perform suspension polymerization. Thus, the temperature was raised from room temperature to 90° C. over 1 hour, then to 100° C. over 15 hours and then to 120° C. over 1.5 hours. The reaction was further continued at 120° C. for 5 hours. The reaction mixture was thereafter cooled to room temperature to form pearl-like polystyrene beads. The polystyrene beads were washed and dried. The polystyrene beads which were found to have Mn of 2.6×10$^5$, Mw of 1.3×10$^6$, Mz of 3.4×10$^6$ and Mz/Mn of 13.1 are hereinafter called Polystyrene C.

Apparatus and Conditions for Producing Extruded Foams:

In Examples 6, 8, 10, 12 and 13 and Comparative Examples 5, 6, 8, 10, 11 and 13, three, first, second and third extruders having diameters of 65 mm, 90 mm and 150 mm, respectively, connected in series were used. The first extruder had a blowing agent feed port at a position near the downstream end thereof. A flat die having a die lip with a width of 65 mm and a clearance of 2 mm (rectangular parallelepiped sectional shape) was attached to a tip end of the third extruder. The extrusion speed was 50 kg per hour.

In Examples 7, 9 and 11 and Comparative Examples 7, 9 and 12, two, first and second extruders having diameters of 150 mm and 200 mm, respectively, connected in series were used. The first extruder had a blowing agent feed port at a position near the downstream end thereof. A flat die having a die lip with a width of 440 mm and a clearance of 3 mm (rectangular parallelepiped sectional shape) was attached to a tip end of the second extruder. The extrusion speed was 1,300 kg per hour.

Raw materials were fed to the first extruder where the raw materials were heated to 220° C., melted and kneaded. The kneaded mass was mixed with the blowing agent at a portion near the downstream end of the first extruder to obtain a foamable composition in the form of a melt. The foamable composition was then passed to the second extruder (and then third extruder in the case of Examples 6, 8, 10, 12 and 13 and Comparative Examples 5, 6, 8, 10, 11 and 13) and extruded from the die lip to the atmosphere. In this case, the temperature of the foamable composition was adjusted at a suitable foaming temperature shown in Tables 4 and 5 in the extruder having the die lip. The foaming temperature was as measured at a position where the die was connected to the extruder. The extrudate which was discharged from the die lip and which started foaming was passed through a guider and compressed there. The extrudate was then allowed to fill in a shaping device and was shaped into a plate, thereby obtaining an extruded foam plate.

EXAMPLES 6 TO 13 AND COMPARATIVE EXAMPLES 5 TO 13

The raw material resins used were selected from a polystyrene resin (Grade: HH32, manufactured by Idemitsu Petrochemical Co., Ltd., Mn: 1.2×10$^5$, Mw: 3.5×10$^5$, Mz: 7.9×10$^5$), Master Batch A, Master Batch B, and Polystyrene C as shown in Tables 4 and 5 each in amounts shown in Tables 4 and 5. Additionally, to 100 parts of the raw material resins, 0.17 part of a talc master batch composed of 35% by weight of the polystyrene resin, 60% by weight of talc (HIFILLER#12, manufactured by Matumura Sangyo Co., Ltd.) and 5% by weight of a dispersant, and 4 parts of a flame retardant master batch composed of 50% by weight of the polystyrene resin and 50% by weight of hexabromocyclododecane).

The blowing agent had a composition shown in Tables 4 and 5 and was used in an amount shown in Tables 4 and 5. The total amounts of the blowing agent ingredients are also shown in Tables 4 and 5 in terms of mole per 1 kg of the polystyrene resin (mol/kg). In Examples 6, 7, 10, 11 and 12 and Comparative Examples 5 to 7 and 10 to 13, 0.1 part a heat stabilizer (Grade: IRGASTAB STYL66, manufactured by Ciba Specialty Chemicals Co., Ltd.) was additionally added to the raw material resins per 100 parts of the raw material resins.

Using the above raw materials, extruded foam plates were produced using the apparatus and production conditions described above. The apparent density, Mn, Mw, Mz/Mn, thickness, lateral sectional area, average cell diameter in the thickness direction, cell strain rate, closed cell content and moldability of the extruded foam plates are shown in Tables 4 and 5.

TABLE 4

|  |  | Example | | | | | | | |
|---|---|---|---|---|---|---|---|---|---|
|  |  | 6 | 7 | 8 | 9 | 10 | 11 | 12 | 13 |
| Polystyrene (HH32) (part) | | 88 | 88 | 88 | 88 | 88 | 88 | 75 | 75 |
| Polystyrene C (part) | | 0 | 0 | 0 | 0 | 0 | 0 | 25 | 25 |
| Master Batch A (part) | | 12 | 12 | 12 | 12 | 12 | 12 | 0 | 0 |
| Amount of blowing agent | $CO_2$ (part) | 1.54 | 1.54 | 0 | 0 | 1.41 | 1.32 | 1.41 | 0 |
|  | Isobutane (part) | 1.66 | 1.66 | 1.65 | 1.65 | 1.86 | 1.74 | 1.86 | 1.65 |
|  | Dimethyl Ether (part) | 0 | 0 | 7.43 | 7.43 | 2.21 | 2.07 | 2.21 | 7.43 |
|  | Ethanol (part) | 3.05 | 3.05 | 0 | 0 | 2.21 | 2.07 | 2.21 | 0 |
|  | Total (part) | 6.25 | 6.25 | 9.08 | 9.08 | 7.68 | 7.20 | 7.68 | 9.08 |
|  | amount (mol/kg) | 1.3 | 1.3 | 1.9 | 1.9 | 1.6 | 1.5 | 1.6 | 1.9 |
| Foaming temperature (° C.) | | 123.5 | 123.0 | 122.5 | 122.0 | 122.0 | 122.0 | 122.0 | 122.5 |
| Apparent density (kg/m³) | | 33.0 | 31.7 | 22.7 | 22.9 | 25.9 | 28.3 | 25.2 | 22.7 |
| Mn (×10⁵) | | 1.0 | 1.1 | 1.1 | 1.1 | 1.0 | 1.0 | 1.2 | 1.2 |
| Mw (×10⁵) | | 2.8 | 2.9 | 3.2 | 3.2 | 3.1 | 3.2 | 4.6 | 4.6 |
| Mz/Mn | | 8.5 | 8.7 | 8.4 | 8.6 | 8.9 | 8.8 | 11.5 | 11.7 |
| Thickness (mm) | | 50 | 80 | 50 | 80 | 50 | 80 | 50 | 80 |
| Sectional area (cm²) | | 100 | 800 | 100 | 800 | 100 | 800 | 100 | 800 |
| Average cell diameter (mm) | | 1.0 | 1.0 | 0.9 | 1.0 | 0.8 | 0.8 | 0.9 | 1.0 |
| Cell strain rate | | 1.1 | 1.2 | 1.0 | 1.2 | 1.2 | 1.3 | 1.2 | 1.1 |
| Closed cell content (%) | | 94 | 93 | 93 | 93 | 92 | 93 | 93 | 93 |
| Moldability | | good | good | good | good | good | good | good | good |

TABLE 5

|  |  | Comparative Example | | | | | | | | |
|---|---|---|---|---|---|---|---|---|---|---|
|  |  | 5 | 6 | 7 | 8 | 9 | 10 | 11 | 12 | 13 |
| Polystyrene (HH32) (part) | | 100 | 88 | 100 | 100 | 100 | 100 | 88 | 88 | 95 |
| Polystyrene C (part) | | 0 | 0 | 0 | 0 | 0 | 0 | 0 | 0 | 5 |
| Master Batch B (part) | | 0 | 12 | 0 | 0 | 0 | 0 | 12 | 12 | 0 |
| Amount of blowing agent | $CO_2$ (part) | 1.54 | 1.54 | 1.54 | 0 | 0 | 1.41 | 1.41 | 1.32 | 1.41 |
|  | Isobutane (part) | 1.66 | 1.66 | 1.66 | 1.65 | 1.65 | 1.86 | 1.86 | 1.74 | 1.86 |
|  | Dimethyl Ether (part) | 0 | 0 | 0 | 7.43 | 7.43 | 2.21 | 2.21 | 2.07 | 2.21 |
|  | Ethanol (part) | 3.05 | 3.05 | 3.05 | 0 | 0 | 2.21 | 2.21 | 2.07 | 2.21 |
|  | Total (part) | 6.25 | 6.25 | 6.25 | 9.08 | 9.08 | 7.68 | 7.68 | 7.20 | 7.68 |
|  | amount (mol/kg) | 1.3 | 1.3 | 1.3 | 1.9 | 1.9 | 1.6 | 1.6 | 1.5 | 1.6 |
| Foaming temperature (° C.) | | 123.0 | 123.0 | 123.0 | 122.5 | 122.0 | 122.0 | 122.5 | 122.0 | 122.0 |
| Apparent density (kg/m³) | | 34.9 | 34.3 | 35.8 | 24.3 | 25.3 | 28.3 | 27.2 | 29.1 | 27.5 |
| Mn (×10⁵) | | 1.1 | 1.0 | 1.0 | 1.0 | 1.1 | 1.1 | 1.1 | 1.1 | 1.1 |
| Mw (×10⁵) | | 3.0 | 3.1 | 3.1 | 3.1 | 3.1 | 3.2 | 3.2 | 3.1 | 3.2 |
| Mz/Mn | | 6.2 | 7.7 | 6.2 | 6.2 | 6.5 | 6.4 | 7.8 | 7.7 | 7.8 |
| Thickness (mm) | | 50 | 50 | 80 | 50 | 80 | 50 | 50 | 80 | 50 |
| Sectional area (cm²) | | 100 | 100 | 800 | 100 | 800 | 100 | 100 | 800 | 100 |
| Average cell diameter (mm) | | 0.9 | 0.9 | 1.0 | 0.9 | 1.0 | 0.8 | 0.9 | 0.9 | 0.9 |
| Cell strain rate | | 1.3 | 1.3 | 1.4 | 1.0 | 1.2 | 1.4 | 1.4 | 1.4 | 1.3 |
| Closed cell content (%) | | 91 | 90 | 88 | 93 | 93 | 85 | 89 | 93 | 89 |
| Moldability | | poor | poor | poor | poor | poor | poor | poor | poor | poor |

Comparison of Example 6 with Comparative Examples 5 and 6, Example 7 with Comparative Example 7, Example 8 with Comparative Example 8, Example 9 with Comparative Example 9, Example 10 with Comparative Examples 10 and 11, Example 11 with Comparative Example 12, Example 12 with Comparative Example 13 and Example 13 with Comparative Example 9 indicates that because Examples 6 to 13 use a significant amount of UHPS the foam plates have a Mz/Mn ratio greater than 8. Therefore, notwithstanding the use of a large amount of blowing agent, the viscosity of the foamable composition remains high and, therefore, the extruded foam plates obtained are free of surface cracks.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for producing a polystyrene resin foam, comprising extruding a foamable composition comprising a melted polystyrene resin and a physical blowing agent through a die attached to an extruder to obtain a polystyrene resin foam having a thickness of at least 10 mm and a transverse cross-sectional area of at least 50 cm², wherein said extrusion is performed so that the ratio Mz/Mn of a Z average molecular weight Mz of the polystyrene resin foam to a number average molecular weight Mn of the polystyrene resin foam, each measured by gel permeation chromatography, is 8.0 or more.

2. A process as claimed in claim 1, wherein the foamable composition within the extruder is heated at a temperature not exceeding 240° C.

3. A process as claimed in claim 1, comprising feeding 0.4 to 50 parts by weight of an ultra-high molecular weight polystyrene resin having Mw of $1.0'10^6$ to $5.0'10^6$, Mn of $1.6'10^5$ to $1.0'10^6$, Mz of $2.5'10^6$ to $7.0'10^6$, Mw/Mn of 3.0 to 6.5 and Mz/Mn of 6.0 to 16.0 and 100 parts by weight of an ordinary molecular weight polystyrene resin having Mw of $1.4'10^5$ to $5.0'10^5$, Mn of $7.0'10^4$ to $1.2'10^5$, Mz of $5.0'10^5$ to $1.5'10^6$, Mw/Mn of 2.0 to 4.0 and Mz/Mn of 5.0 to 7.5 to the extruder, melting and kneading the feeds to obtain a kneaded mass, and mixing the kneaded mass with the physical blowing agent to obtain the foamable composition.

4. A process as claimed in claim 1, comprising melting and kneading an ultra-high molecular weight polystyrene resin having Mw of $1.0'10^6$ to $5.0'10^6$, Mn of $1.6'10^5$ to $1.0'10^6$, Mz of $2.5'10^6$ to $7.0'10^6$, Mw/Mn of 3.0 to 6.5 and Mz/Mn of 6.0 to 16.0 together with an ordinary molecular weight polystyrene resin having Mw of $1.4'10^5$ to $5.0'10^5$, Mn of $7.0'10^4$ to $1.2'10^5$, Mz of $5.0'10^5$ to $1.5'10^6$, Mw/Mn of 2.0 to 4.0 and Mz/Mn of 5.0 to 7.5 to obtain a blend having Mz/Mn of 9.0 to 16.0, feeding the blend to the extruder, melting and kneading the feed to obtain a kneaded mass, and mixing the kneaded mass with the physical blowing agent to obtain the foamable composition.

5. A process as claimed in claim 1, comprising melting and kneading an ultra-high molecular weight polystyrene resin having Mw of $1.0'10^6$ to $5.0'10^6$, Mn of $1.6'10^5$ to $1.0'10^6$, Mz of $2.5'10^6$ to $7.0'10^6$, Mw/Mn of 3.0 to 6.5 and Mz/Mn of 6.0 to 16.0 together with an ordinary molecular weight polystyrene resin having Mw of $1.4'10^5$ to $5.0'10^5$, Mn of $7.0'10^4$ to $1.2'10^5$, Mz of $5.0'10^5$ to $1.5'10^6$, Mw/Mn of 2.0 to 4.0 and Mz/Mn of 5.0 to 7.5 to obtain a blend having Mz/Mn of greater than 16.0 and Mz of at least $2.0'10^6$, feeding the blend to the extruder together with an ordinary molecular weight polystyrene resin, melting and kneading the feeds to obtain a kneaded mass, and mixing the kneaded mass with the physical blowing agent to obtain the foamable composition.

6. A process as claimed in claim 5, wherein said blend has Mz of $2.0'10^6$ to $4.5'10^6$.

7. A process as claimed in claim 6, wherein said blend has Mn of $7.0'10^4$ to $1.6'10^5$ and Mw/Mn of 4.0 to 15.0.

8. A process as claimed in claim 1, wherein said number average molecular weight Mn is in the range of $8.0'10^4$ to $1.5'10^5$.

9. A process as claimed in claim 1, wherein said melted polystyrene resin comprises a mixture which is obtained by melting and kneading at least two different polystyrene resins having different molecular weight distributions and which has a Z average molecular weight of $2.0'10^6$ or more.

10. A process as claimed in claim 1, wherein the polystyrene resin foam has an apparent density of 20 to 35 kg/m³.

11. A process as claimed in claim 9, wherein said melted polystyrene resin further comprises a polystyrene resin having a weight average molecular weight of $1.5'10^5$ to $4.5'10^5$.

12. A process as claimed in claim 1, wherein said foamable composition further comprises a heat stabilizer.

13. A process as claimed in claim 1 further comprising obtaining a polystyrene resin by suspension polymerization, seed polymerization or multi-stage polymerization, the obtained polystyrene resin having a Mz/Mn of at least 9.0, a Mn of $7.0'10^4$ to $1.4'10^5$, a Mz of $6.5'10^5$ to $2.0'10^6$, and a Mw/Mn of 3.0 to 6.0 and feeding the obtained polystyrene to the extruder.

14. A process as claimed in claim 13 wherein Mz/Mn is 10.0-16.0.

15. A process as claimed in claim 1 further comprising:

feeding to the extruder a polystyrene selected from the group consisting of:

A. a blend of (1) 0.4-50 parts by weight of an ultra-high molecular weight polystyrene resin having a Mw of $1.0'10^6$ to $5.0'10^6$, a Mn of $1.6'10^5$ to $1.0'10^6$, a Mz of $2.5'10^6$ to $7.0'10^6$, a Mw/Mn of 3.0 to 6.5 and a Mz/Mn of 6.0 to 16.0 and (2)100 parts by weight of an ordinary molecularweight polystyrene resin having a Mw of $1.4'10^5$ to $5.0'10^5$, a Mn of $7.0'10^4$ to $1.2'10^5$, a Mz of $5.0'10^5$ to $1.5'10^6$, a Mw/Mn of 2.0 to 4.0 and a Mz/Mn of 5.0 to 7.5; and B. a blend having a Mz/Mn of 9.0-16.0 obtained by melting and kneading (1) an ultra-high molecular weight polystyrene resin having a Mw of $1.0'10^6$ to $5.0'10^6$, a Mn of $1.6'10^5$ to $1.0'10^6$, a Mz of $2.5'10^6$ to $7.0'10^6$, a Mw/Mn of 3.0 to 6.5 and a Mz/Mn of 6.0 to 16.0 an ordinary molecular weight polystyrene resin having a Mw of $1.4'10^5$ to $5.0'10^5$, a Mn of $7.0'10^4$ to $1.2'10^5$, a Mz of $5.0'10^5$ to $1.5'10^6$, a Mw/Mn of 2.0 to 4.0 and a Mz/Mn of 5.0 to 7.5;

C. a blend having a Mz/Mn of greater than 16.0 and a Mz of at least $2.0\times10^6$ obtained by melting and kneading (1) an ultra-high molecular weight polystyrene resin having a Mw of $1.0'10^6$ to $5.0'10^6$, a Mn of $1.6'10^5$ to $1.0'10^6$, a Mz of $2.5'10^6$ to $7.0'10^6$, a Mw/Mn of 3.0 to 6.5 and a Mz/Mn of 6.0 to 16.0 and (2) an ordinary molecular weight polystyrene resin having a Mw of $1.4'10^5$ to $5.0'10^5$, a Mn of $7.0'10^4$ to $1.2'10^5$, a Mz of $5.0'10^5$ to $1.5'10^6$, a Mw/Mn of 2.0 to 4.0 and a Mz/Mn of 5.0 to 7.5; and D. a polystyrene resin obtained by suspension polymerization, seed polymerization or multi-stage polymerization, the obtained polystyrene resin having a Mz/Mn of at least 9.0, a Mn of $7.0'10^4$ to $1.4'10^5$, a Mz of $6.5'10^5$ to $2.0'10^6$, and a Mw/Mn of 3.0 to 6.0;

melting and kneading the polystyrene fed to the extruder to obtain the melted polystyrene resin as a kneaded mass; and mixing the kneaded mass with the physical blowing agent to obtain the foamable composition.

* * * * *

UNITED STATES PATENT AND TRADEMARK OFFICE
CERTIFICATE OF CORRECTION

PATENT NO. : 7,244,380 B2  Page 1 of 1
APPLICATION NO. : 11/107874
DATED : July 17, 2007
INVENTOR(S) : Naochika Kogure et al.

It is certified that error appears in the above-identified patent and that said Letters Patent is hereby corrected as shown below:

Column 18, line 23 (claim 15, line 9) "molecularweight" should read --molecular weight --.

Column 18, line 33 (claim 15, line 18) "16.0 an" should read -- 16.0 and (2) an --.

Signed and Sealed this

Fourth Day of December, 2007

JON W. DUDAS
*Director of the United States Patent and Trademark Office*